US012652343B2

(12) United States Patent
Li et al.

(10) Patent No.: US 12,652,343 B2
(45) Date of Patent: Jun. 9, 2026

(54) BATTERY COVER COLOR CHANGE METHOD AND ELECTRONIC DEVICE

(71) Applicant: Honor Device Co., Ltd., Shenzhen (CN)

(72) Inventors: Haifei Li, Shenzhen (CN); Xiaoliang Li, Shenzhen (CN); Shi Cao, Shenzhen (CN); Jinning Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 314 days.

(21) Appl. No.: 18/269,190

(22) PCT Filed: Dec. 30, 2022

(86) PCT No.: PCT/CN2022/143784
§ 371 (c)(1),
(2) Date: Jun. 22, 2023

(87) PCT Pub. No.: WO2023/138344
PCT Pub. Date: Jul. 27, 2023

(65) Prior Publication Data
US 2024/0396985 A1     Nov. 28, 2024

(30) Foreign Application Priority Data

Jan. 19, 2022    (CN) ......................... 202210062342.0
Jul. 19, 2022    (CN) ......................... 202210847491.8

(51) Int. Cl.
*H04M 1/02*          (2006.01)
*H04M 1/72442*       (2021.01)
(52) U.S. Cl.
CPC ...... *H04M 1/0266* (2013.01); *H04M 1/72442* (2021.01); *H04M 2250/16* (2013.01)

(58) Field of Classification Search
CPC .. H04M 1/0266; H04M 1/0262; H04M 1/026; H04M 1/72442; H04M 1/7243;
(Continued)

(56) References Cited

U.S. PATENT DOCUMENTS

2007/0199432 A1    8/2007   Abe et al.
2008/0053293 A1    3/2008   Georges et al.
(Continued)

FOREIGN PATENT DOCUMENTS

CN          101459714  A       6/2009
CN          107172239  A       9/2017
(Continued)

OTHER PUBLICATIONS (CN 107483731 A) , Zheng et al.,Audio Playing Volume Controlling Method, Device and Storage Medium and Mobile Terminal, Dec. 2017, pp. 1-11 (Year: 2017).*

*Primary Examiner* — Keith Ferguson
(74) *Attorney, Agent, or Firm* — Slater Matsil, LLP

(57)          ABSTRACT

This application provides a battery cover color change method applicable to an electronic device and the electronic device. The electronic device includes an application and a battery cover. The method includes: sending audio data to an audio playing process by the application; in an audio playing process, obtaining color change data based on the first audio data, where the color change data corresponds to rhythms of the first audio data; and playing the first audio data while the battery cover changes colors in accordance with the rhythms of the first audio data driven by the color change data.

20 Claims, 12 Drawing Sheets

(58) Field of Classification Search
CPC ......... H04M 1/72439; H04M 2250/16; H04M
1/0283; H04M 1/72484
See application file for complete search history.

(56) References Cited

U.S. PATENT DOCUMENTS

| | | | | |
|---|---|---|---|---|
| 2013/0281169 A1* | 10/2013 | Coverstone | ..... | H04M 1/724092 |
| | | | | 455/575.8 |
| 2014/0221052 A1* | 8/2014 | Huang | ................ | H04M 19/048 |
| | | | | 455/567 |
| 2020/0285359 A1* | 9/2020 | Coverstone | .......... | A45C 11/002 |
| 2021/0306450 A1 | 9/2021 | Chen | | |

FOREIGN PATENT DOCUMENTS

| | | | |
|---|---|---|---|
| CN | 107635072 | A | 1/2018 |
| CN | 107728400 | A | 2/2018 |
| CN | 107943211 | A | 4/2018 |
| CN | 109104529 | A | 12/2018 |
| CN | 112866770 | A | 5/2021 |
| CN | 112883223 | A | 6/2021 |
| CN | 113890938 | A | 1/2022 |
| CN | 114554008 | A | 5/2022 |
| JP | 2021111871 | A | 8/2021 |

* cited by examiner

Current Status 4G 4G    08:08

← Auxiliary Functions   303

Barrier-Free   304

One-Hand Mode   305   On

Quick Start & Gesture

Intelligent Sensing

Smart Multi-window

Holster Operation   On

Mistouch Prevention Mode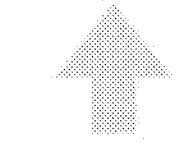
Prevent a misoperation of the mobile phone in the pocket Timed On/Off Is searching for another setting item?

System Navigation Mode

Newly-Added Entrance "Rhythmic Shine"

4G 4G    08:08

← Auxiliary Functions

Barrier-Free

Rhythmic Shine   306

One-Hand Mode   On

Quick Start & Gesture

Intelligent Sensing

Smart Multi-window

Holster Operation   On

Mistouch Prevention Mode
Prevent a misoperation of the mobile phone in the pocket Timed On/Off Is searching for another setting item?

System Navigation Mode

Barrier-Free

Characteristic Function

Action & Gesture

Sensing Functions

General Functions

FIG. 3B

BATTERY COVER COLOR CHANGE METHOD AND ELECTRONIC DEVICE

CROSS-REFERENCE TO RELATED APPLICATIONS

This application is a national stage of International Application No. PCT/CN2022/143784, filed on Dec. 30, 2022, which claims priority to Chinese Patent Application No. 202210847491.8, filed on Jul. 19, 2022, and Chinese Patent Application No. 202210062342.0, filed on Jan. 19, 2022. The disclosures of both of the aforementioned applications are hereby incorporated by reference in their entireties.

TECHNICAL FIELD

This application relates to the technical field of electronic devices, and in particular, to a battery cover color change method and an electronic device.

BACKGROUND

Accompanied with the development and popularization of electronic devices, electronic devices such as mobile phones and computers have been inseparable from people's lives, can be seen everywhere in life, and greatly improve people's living standards. The aesthetics of electronic devices, for example, the aesthetics of housings of the electronic devices, directly decide the purchase intention of consumers. At present, the colors of the housings of the electronic devices are generally fixed, and to implement interactions between colors of the appearance of the electronic devices and users, a color change solution may be used for battery covers of the electronic devices, so as to increase the degree of recognition of products.

Electrochromism is a phenomenon that optical properties (reflectivity, transmittance, absorption rate, and the like) of a material undergo a stable and reversible color change under the action of an external electric field, which is manifested as a reversible change in color and transparency in the appearance. For example, the electronic device is a mobile phone. A material having an electrochromic property is applied to a rear housing, that is, a battery cover, of the mobile phone, so that the battery cover of the mobile phone can change colors based on playing of an audio in different scenarios. However, audio subsystems in the current widely used Android (Android) systems are quite complex, and how to adapt an audio subsystem of an electronic device, to enable a battery cover of the electronic device to change colors along with playing of an audio is a problem to be solved.

SUMMARY

Embodiments of this application provide a battery cover color change method and an electronic device, which solve the technical problem of driving a battery cover to change colors by using an audio playing process of the electronic device, to enable the battery cover of the electronic device to change colors along with playing rhythms of an audio, thereby meeting use requirements of a plurality of scenarios.

To achieve the foregoing objective, the embodiments of this application provide the following technical solutions:

In a first aspect, this application provides a battery cover color change method, applicable to an electronic device. The electronic device includes an application and a battery cover. The method includes:

sending, by the application, first audio data to an audio playing process;

in the audio playing process, obtaining color change data based on the first audio data, where the color change data corresponds to rhythms of the first audio data; and playing the first audio data while the battery cover changes colors in accordance with the rhythms of the first audio data driven by the color change data.

By the battery cover color change method applicable to an electronic device provided in the embodiments of this application, the battery cover of the electronic device can change colors along with playing rhythms of an audio, and the technical problem of driving the battery cover to change colors by using the audio playing process of the electronic device is solved.

In a possible implementation, the application is an incoming call application, an alarm application, or a calendar application.

In this embodiment, any one of the incoming call application, the alarm application, or the calendar application in the electronic device can enable a battery cover color change function when an audio needs to be played, so as to provide a reminder to a user from two sensory dimensions, auditory and visual.

In a possible implementation, the first audio data sequentially passes through an application layer, an application framework, an audio hub service layer, an audio hardware abstraction layer, and a kernel layer in the audio playing process.

In a possible implementation, before sending the audio data by the application, whether a battery cover color change switch is in an on state is determined, and the application sends an audio control signal to the audio hardware abstraction layer, where the audio control signal is used for configuring a battery cover path, and the battery cover path is used for transmitting and processing the color change data.

In this embodiment, by setting on and off states of the battery cover color change switch, the user can control whether to enable the battery cover color change function, thereby increasing the operation flexibility of the electronic device. Further, after determining that the battery cover color change switch is in the on state, the application sends an audio control signal to configure a battery cover color change path, so as to prepare for subsequent playing of the audio data and sending of the color change data of the battery cover.

In a possible implementation, the sending, by the application, first audio data to an audio playing process specifically includes:

sending, by the application layer, the first audio data to the application framework layer;

processing, separately by the application framework layer and the audio hub service layer, the first audio data, where the audio hub service layer outputs second audio data to the audio hardware abstraction layer; and receiving and processing, by the audio hardware abstraction layer, the second audio data to obtain third audio data, and outputting the third audio data to an audio virtual device in the kernel layer.

In a possible implementation, in the audio playing process, the obtaining color change data based on the first audio data further includes generating color change data based on the audio data by using a conversion algorithm.

In a possible implementation, the conversion algorithm is an audio rhythm identification algorithm, to enable rhythms of the color change data to correspond to the rhythms of the first audio data.

In a possible implementation, in the audio playing process, the obtaining the color change data based on the first audio data further includes obtaining, by a conversion algorithm module in the audio hardware abstraction layer, the color change data based on the second audio data, and outputting the color change data to a battery cover virtual device in the kernel layer.

In this embodiment, the conversion algorithm used specifically refers to an audio rhythm identification algorithm. In the audio playing process, color change data is obtained in real time based on audio data, so that color change data corresponding to rhythms of audio data to be played can be obtained, to enable the battery cover to change colors along with the rhythms of the audio data driven by the color change data.

In a possible implementation, in the audio playing process, the obtaining color change data based on the first audio data further includes: the first audio data including the color change data, where the color change data is manually edited and combined into the first audio data in advance; and splitting the color change data from the first audio data by using a splitting algorithm.

In a possible implementation, in the audio playing process, the obtaining color change data based on the first audio data further includes splitting, by an audio splitting module in the audio hardware abstraction layer, the second audio data into the third audio data and the color change data, outputting the third audio data to the audio virtual device in the kernel layer, and outputting the color change data to a battery cover virtual device in the kernel layer.

In a possible implementation, the color change data is obtained from the first audio data that has undergone an audio rhythm identification algorithm.

In this embodiment, the color change data corresponding to the audio data is obtained in advance by using a conversion algorithm, is combined with the audio data by manual editing, and then is split out in the audio playing process, to obtain the color change data, to enable the battery cover to change colors along with the rhythms of the audio data driven by the color change data.

In a possible implementation, in the audio playing process, the obtaining color change data based on the first audio data further includes storing the color change data in the electronic device, where the audio control signal includes an index corresponding to the first audio data, and loading the color change data based on the index, where the color change data corresponds to the first audio data.

In a possible implementation, in the audio playing process, the obtaining color change data based on the first audio data further includes loading, by a loading module in the audio hardware abstraction layer, the color change data based on the index, and transmitting the color change data to an audio distribution module in the audio hardware abstraction layer.

In a possible implementation, the color change data is obtained from the first audio data that has undergone an audio rhythm identification algorithm.

In a possible implementation, if the first audio data is external audio data, default color change data corresponding to a default index is loaded.

In this embodiment, the color change data is stored in the electronic device in advance, the corresponding color change data is loaded based on the audio data to be played, and the audio data and the color change data are separately transmitted through an audio playing path, to enable the battery cover to change colors based on the rhythms of the audio data driven by the color change data. In addition, when the user chooses to play external audio data, the battery cover color change function can also be realized.

In a second aspect, this application further provides an electronic device. The electronic device includes: one or more processors, a memory, and a battery cover. The memory is configured to store program code. The one or more processors are configured to run the program code, to cause the electronic device to perform the battery cover color change method according to the first aspect or any possible implementation of the first aspect.

In a third aspect, this application further provides a computer-readable storage medium. The computer-readable storage medium includes instructions, and the instructions, when run on an electronic device, cause the electronic device to perform the battery cover color change method according to the first aspect and any possible implementation of the first aspect.

BRIEF DESCRIPTION OF THE DRAWINGS

FIG. 3B is a secondary diagram of a menu for setting a color change function in an electronic device according to an embodiment of this application;

DETAILED DESCRIPTION OF ILLUSTRATIVE EMBODIMENTS

In the specification, claims, and accompanying drawings of this application, the terms "first", "second", "third", and the like are intended to distinguish between different objects but do not indicate a particular order.

In the embodiments of this application, the terms "exemplary" or "for example" are used for giving an example, an illustration, or a description. Any embodiment or design scheme described as an "exemplary" or "for example" in the embodiments of this application should not be explained as being more preferred or having more advantages than another embodiment or design scheme. Exactly, use of the terms, such as "exemplarily" or "for example", is intended to present a related concept in a specific manner.

An embodiment of this application provides a battery cover color change method. The method can be applicable to an electronic device. The electronic device may be any electronic device such as a mobile phone, a wearable device, a tablet computer, or a laptop, which is not limited in this embodiment of this application. For example, the electronic device is a mobile phone.

Figure 1:
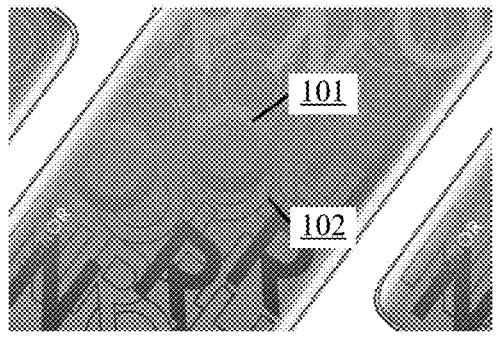
FIG. 1 is a partial diagram of a battery cover of an electronic device according to an embodiment of this application.

FIG. 1 illustrates a rear cover, that is, a battery cover, of an electronic device according to an embodiment of this application. For example, the electronic device is a mobile phone. An electrochromic material is applied to a battery cover of the mobile phone. For example, the electrochromic material is applied in areas 101 such as solid letters O, R, H, and the like, and in outlines 102 such as hollowed letters O, R, H, and the like. In a particular audio playing scenario, for example, in scenarios such as an incoming call ringing, an alarm ringing, or a schedule reminder, according to the battery cover color change method of this embodiment of this application, the areas to which the electrochromic material is applied as shown in the figure change colors along with playing of an audio when the electronic device plays the audio. In other words, the electrochromic material in these areas may change colors driven by the color change data. A battery cover color change frequency may vary depending on rhythms of the audio played. For example, the color of the battery cover may change from blue to white and then from white to blue, or switch between blue and white, and so on, along with playing of the audio. An original color and an electrochromic color of the battery cover depend on properties of the material of the battery cover and the electrochromic material, which are not limited herein.

In addition, since the battery cover color change method of this embodiment of this application is used, the electronic device may obtain the color change data corresponding to the audio data by using the audio data played, to enable the color change frequency of the battery cover to correspond to the rhythms of the audio data, and the electrochromic properties can achieve millisecond response, so that the color of the battery cover can be quickly changed to a degree synchronized with playing of the audio. In this way, in scenarios such as an incoming call ringing, an alarm ringing, and a schedule reminder, the electronic device can further visually prompt a user through a color change of the battery cover in addition to audibly prompting the user in a manner of playing an audio, thereby implementing user experience in a plurality of sensory dimensions.

Further, during color change of the battery cover having a color change function, the battery cover itself does not emit light, but the color of the battery cover changes. Therefore, in a dark environment, the battery cover color change function does not cause light interference to the user. In addition, the color change area on the battery cover may not be limited to the pattern shown in this embodiment of this application, and the electrochromic material may be arranged in various patterns and text forms to appear when the battery cover changes color, so as to achieve a cool and personalized effect.

Figure 2:
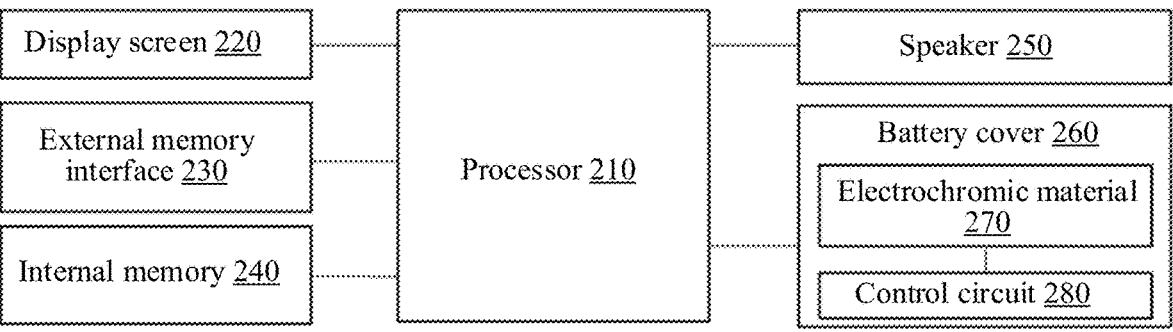
FIG. 2 is a schematic structural diagram of an electronic device according to an embodiment of this application.

FIG. 2 is a schematic structural diagram of an electronic device according to an embodiment of this application. The electronic device may include a processor 210, a display screen 220, an external memory interface 230, an internal memory 240, a speaker 250, and a battery cover 260. The battery cover 260 may include an electrochromic material 270 and a control circuit 280.

It may be understood that the structure shown in this embodiment constitutes no specific limitation on the electronic device. In some other embodiments, the electronic device may include more or fewer components than those shown in the figure, or some components may be combined, or some components may be split, or components are arranged in different manners. The components shown in the figure may be implemented by hardware, software, or a combination of software and hardware.

The processor 210 may include one or more processing units. For example, the processor 210 may include an application processor (application processor, AP), a modulation and demodulation processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The external memory interface 230 may be configured to connect to an external storage card such as a micro SD card, to expand a storage capability of the electronic device. The external storage card communicates with the processor 210 by using the external memory interface 230, to implement a data storage function, such as storing a file such as a music or a video in the external storage card.

The internal memory 240 may be configured to store computer-executable program code. The executable program code may include an operating system, an application (such as an audio playing function) required by at least one function, and the like. The executable program code includes instructions, and the processor 210 runs the instructions stored in the internal memory 240 to cause the electronic device to execute various functional applications and data processing. For example, in this embodiment, the processor 210 executes instructions stored in the internal memory 240 to cause the electronic device to perform the battery cover light-emitting control method provided in this embodiment of this application.

The internal memory 240 may include a program storage area and a data storage area. The data storage area may store data (for example, audio data, an address book, and the like) and the like created when the electronic device is used. The program storage area may be configured to store computer-executable program code. In addition, the internal memory 240 may include a high-speed random access memory, or may include a non-volatile memory such as at least one disk storage memory, a flash memory, or a universal flash storage apparatus (universal flash storage, UFS).

The speaker 240 may be configured to play an audio, for example, an incoming call ringtone, an information prompt tone, a music, and the like. In particular, the speaker 240 may be equipped with a smart power amplifier SmartPA, to which a feedback for an output signal is added, so that the sound quality can be improved to a particular extent while protecting a sounding device.

The battery cover 260 may include an electrochromic material 270 and a control circuit 280. The control circuit 280 is connected to the electrochromic material 270, so that the electrochromic material 270 in the battery cover 260 can change colors under the control of the control circuit 280.

In addition, an operating system runs on the foregoing components, for example, the Android (Android) open source operating system developed by Google, the Windows operating system developed by Microsoft, the iOS operating system developed by Apple, and the like. An application may be installed and run on the operating system.

The operating system of the electronic device may use a layered architecture, an event-driven architecture, a micro-kernel architecture, a micro service architecture, or a cloud architecture. In this embodiment of this application, the software structure of the electronic device is exemplarily described by using an Android system having a layered architecture as an example.

In the hierarchical architecture, software is divided into several layers, and each layer has a clear role and task. The layers communicate with each other through a software interface. For example, in some embodiments, the Android system is divided into: an application layer, an application framework layer, a hardware abstraction layer, and a kernel layer.

It should be noted that although this embodiment of this application is described by using an Android system as an example, the basic principle is also applicable to an electronic device based on an operating system such as iOS or Windows.

To enable the electronic device to implement the function that the battery cover changes colors along with playing of an audio by using an audio playing process, the audio playing process of the electronic device is improved and adapted in this embodiment of this application. The battery cover color change method according to this embodiment of this application is further described in detail below.

Figure 3A:
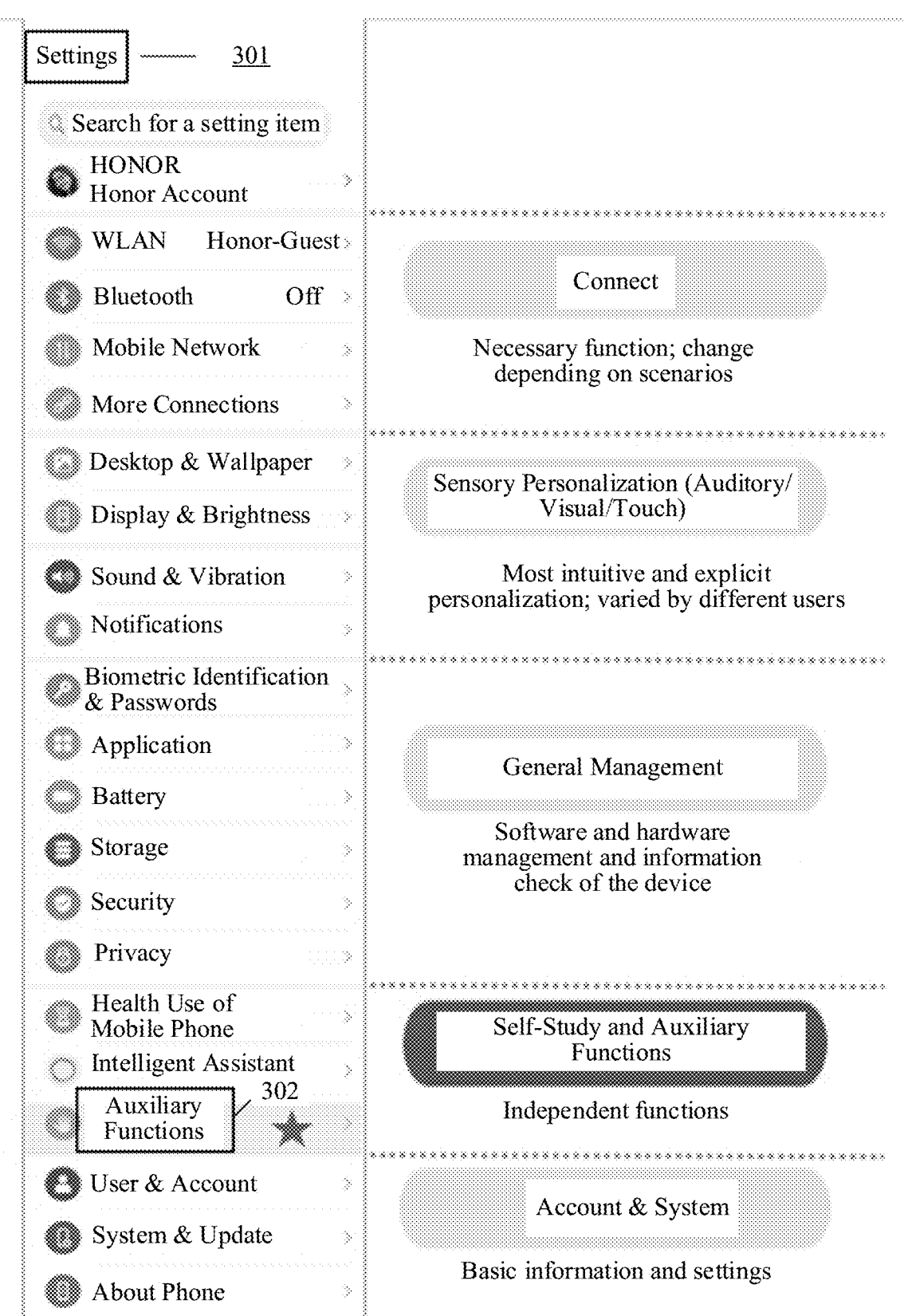
FIG. 3A is a diagram of a menu for setting a color change function in an electronic device according to an embodiment of this application.

FIG. 3A is a diagram of a menu for setting a color change function in an electronic device according to an embodiment of this application. Referring to FIG. 3A, a first level menu entry may be provided for the color change function in a "Settings" 301 menu of the electronic device. For example, a color change function may be regarded as pertaining to "Self-Study and Auxiliary Functions", and the color change function may be classified as "Auxiliary Functions" 302. Alternatively, the color change function may be classified into other functions.

A next level of menu may be entered by clicking/tapping on the entry "Auxiliary Functions" 302, as shown in FIG. 3B. FIG. 3B is a secondary diagram of a menu for setting a color change function in an electronic device according to an embodiment of this application. Referring to FIG. 3B, the "Auxiliary Functions" may include various categories such as a barrier-free 303, a one-hand mode 304, and a quick start & gesture 305. An entrance of the color change function may be set below the entry "Barrier-Free" 303. For example, the color change function may be named as "Rhythmic Shine" 306, or the color change function may be named in other ways, which is not limited herein. In some implementations, the color change function may be set above other functions as a characteristic function, so that a user can easily find the newly added entry "Rhythmic Shine" 306 after opening the auxiliary function menu, to try and use the color change function more easily. In other implementations, the color change function may also be placed at any position in the auxiliary function menu, which is not limited herein. In addition, the entry "Rhythmic Shine" may be included in the menu "Setting" 301 in FIG. 3A, to be in a same level as the "Auxiliary Functions" 302, which is not limited herein.

Figure 3C:
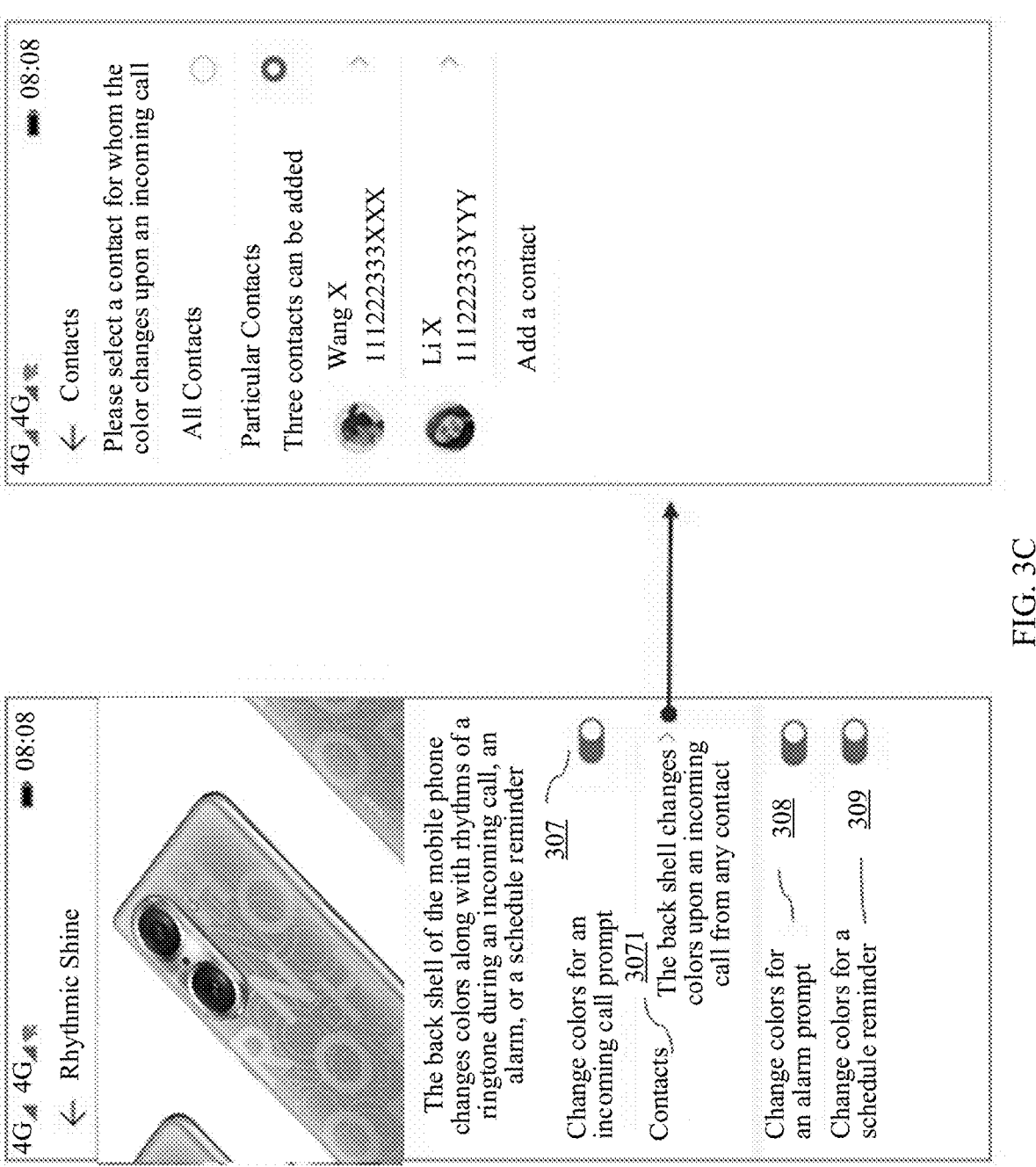
FIG. 3C is a diagram of an interface for setting a color change function in an electronic device according to an embodiment of this application.

In FIG. 3B, the entry "Rhythmic Shine" 306 may be clicked/tapped to enter a next level of menu, in which the color change function can be set in detail, as shown in FIG. 3C. FIG. 3C is a diagram of an interface for setting a color change function in an electronic device according to an embodiment of this application. Referring to FIG. 3C, a switch of the color change function may be set for each application in an interface of FIG. 3C.

For an incoming call application, an incoming call reminder color change switch 307 is turned on, and in addition, incoming calls from which contacts and for which the color change function is enabled may be further selected in a next level of submenu. For example, an entry "Contacts" 3071 is clicked/tapped on to enter a next level of submenu, in which enabling the color change function for incoming calls from all contacts, or enabling the color change function for incoming calls of particular contacts may be selected.

During selection of the particular contacts, any number of contacts may be added; or, a definite number of contacts may be added, for example, a maximum of three contacts, to highlight the particularity of incoming calls from these contacts, so as to achieve the purpose of helping a user to identify a contact of an incoming call more clearly. In a subsequent case, if the number of contacts selected to be added is greater than three, the electronic device may display "Unable to add the contact(s)". If the number of contacts selected to be added is less than or equal to three, the electronic device displays "Successfully added the contact (s)". The number "three" herein is used merely as an example but not a limitation.

For an alarm application, in this embodiment of this application, by turning on an alarm reminder color change switch 308, the electronic device can be enabled to implement synchronous color change of the battery cover when the alarm rings. In other embodiments of this application, in a case that the alarm reminder color change switch 308 is turned on, which alarm for which the color change function is enabled may be further selected. For example, enabling the color change function for an alarm 1 at 10:00 AM may be selected, so that a user can also see the color change of the battery cover while hearing a ringtone, so as to achieve an auditory-and-visual dual reminder effect.

For a calendar application, in this embodiment of this application, in a case that a schedule reminder color change switch 309 of the electronic device is turned on, the electronic device may implement a battery cover color change function while playing an audio to notify a user of a particular schedule.

The above are only examples to describe the method for setting a color change switch for an application in the electronic device, it should be understood that a color change switch can be set for another application.

In another possible implementation, states of color change switches may also be set inside applications, and the manner of setting a color change switch is not limited in this application.

The following embodiments are discussed in a case that the color change switches of the applications are on.

Embodiment 1

Figure 4A:
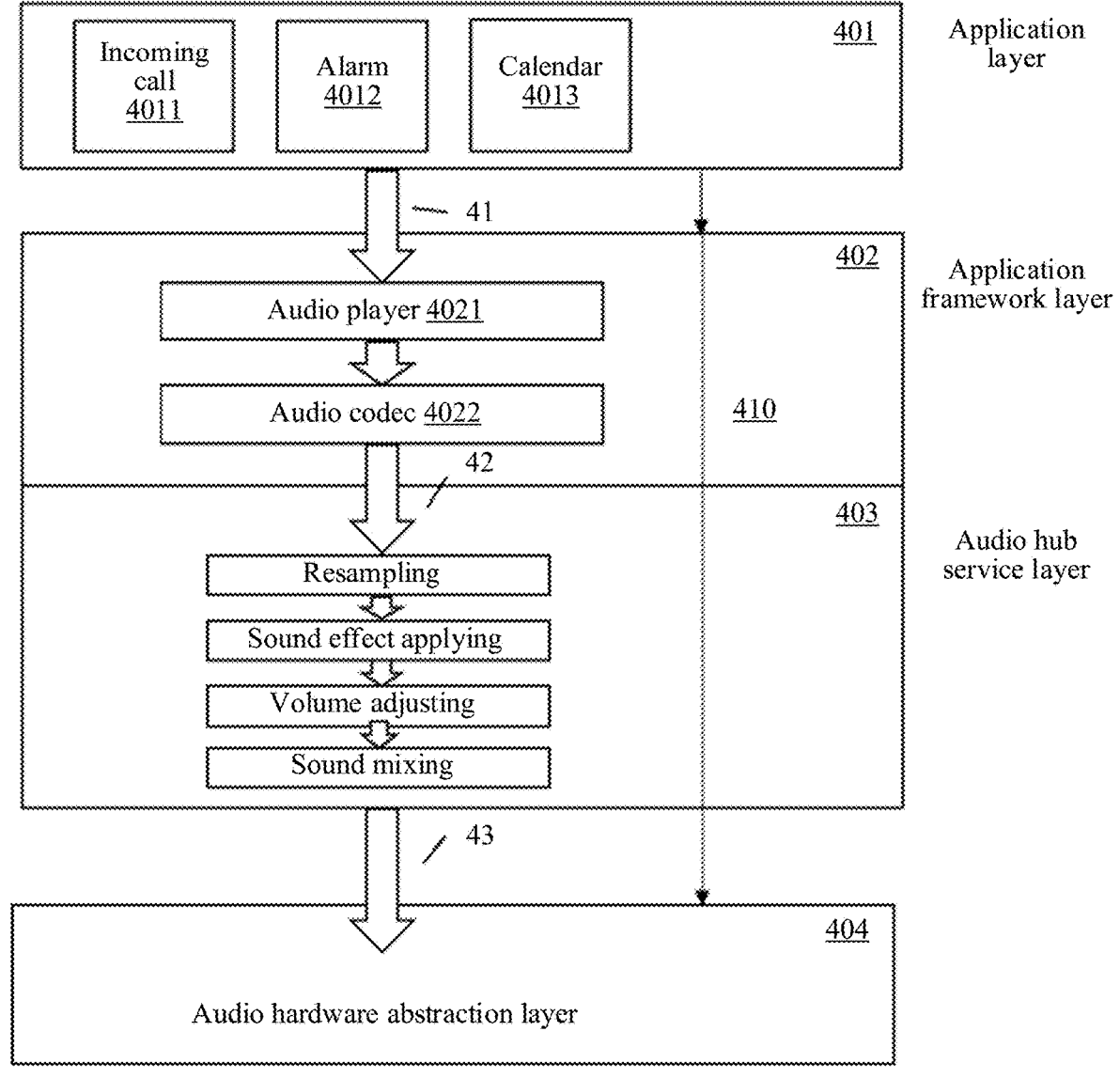
FIG. 4A is a software flow block diagram of a battery cover color change method according to an embodiment of this application.

FIG. 4A is a software flow block diagram of a battery cover color change method according to an embodiment of this application.

An application layer (application layer) may include a series of application packages. The application packages may include an incoming call reminder, an alarm, a schedule reminder, and the like. Each application may initiate playing of an audio in different scenarios and drive a battery cover to change colors at the same time.

An application framework (framework, FWK) layer provides an application programming interface (application programming interface, API) and a programming framework for an application at an application layer. The application framework layer includes some predefined functions. The application framework layer may include a window manager, a call manager, a resource manager, an audio player, and the like.

A hardware abstraction layer (hardware abstract layer, HAL) is an interface layer between a kernel of an operating system and a hardware circuit, and its purpose is abstracting hardware. In the HAL, details of a hardware interface of a particular hardware platform are hidden, which provides a virtual hardware platform for the operating system, so that the operating system has a hardware independence, and that the operating system can be portable among a plurality of hardware platforms.

A kernel (kernel) layer is a layer between hardware and software. The kernel layer includes at least a display driver, a camera driver, an audio driver, and a sensor driver.

When processing an audio, an operating system of a mobile phone may be divided into an application layer, an application framework layer, an audio hub service layer (AudioFlinger), a hardware abstraction layer, and a kernel layer according to processing logic of an audio service.

The audio hub service layer is an audio hub in an Android system, and is also a system service that plays the role of supporting (providing an access interface for an upper layer) and enabling (managing an audio device by using a hardware abstraction layer).

Referring to FIG. 4A, in a scenario such as an incoming call ringing, an alarm ringing, or a schedule reminder, an application (for example, an incoming call application 4011, an alarm application 4012, or a calendar application 4013) in an application layer 401 first sends an audio control signal 410 to an audio hardware abstraction layer 404, to notify the audio hardware abstraction layer 404 that a battery cover color change function needs to be enabled for playing of audio data this time. The audio hardware abstraction layer 404, after receiving the audio control signal 410, configures a battery cover color change path, for example, turning on an audio virtual device (PCM) and a color change data path corresponding to color change data, and the like. The color change data path enables the color change data and the audio data to be transmitted independently of each other in an audio playing process without interfering with each other. In another aspect, the application may send an audio data stream (as indicated by wide arrows in FIG. 4A) to the application framework layer 402. The audio data stream carries audio data to be played 41.

The application framework layer 402 may initialize an audio player MediaPlayer 4021 in an electronic device upon detection of the audio data 41. The audio data 41 may then be decoded by an audio codec MediaCodec 4022 (the decoding process is a software decoding process, and may therefore be referred to as soft decoding), to obtain decoded audio data 42. The audio data 42 is transferred to an audio hub service layer AudioFlinger 403.

The audio hub service layer 403 processes the decoded audio data 42 to obtain audio data 43. The processing content includes but is not limited to: resampling (Resample), sound effect applying (Apply Effect), volume adjusting (Adjust Volume), and sound mixing (Mixer). The processed audio data 43 may then arrive at the audio hardware abstraction layer AudioHal 404 for further processing.

The audio hardware abstraction layer 404 may configure a battery cover path upon receipt of the audio control signal 410 from the application layer 401, so that the battery cover path is configured to transmit and process the color change data. In this case, the audio hardware abstraction layer 404 needs to determine whether the audio data 43 is to be played by a speaker of the electronic device. If the electronic device is connected to an external device such as a headset or a Bluetooth speaker, so that the audio data is to be played by the headset or the Bluetooth speaker instead of by the speaker of the electronic device, the audio hardware abstraction layer 404 may not configure the battery cover path, that is, does not turn on the audio virtual device (PCM) and the color change data path corresponding to the color change data. In this case, the audio data only arrives at the external device through an audio data path for playing, and the battery cover does not change colors. Upon determining that the audio data is to be played by the speaker of the electronic device, the audio hardware abstraction layer 404 configures the battery cover path, specifically in the following.

Figure 4B:
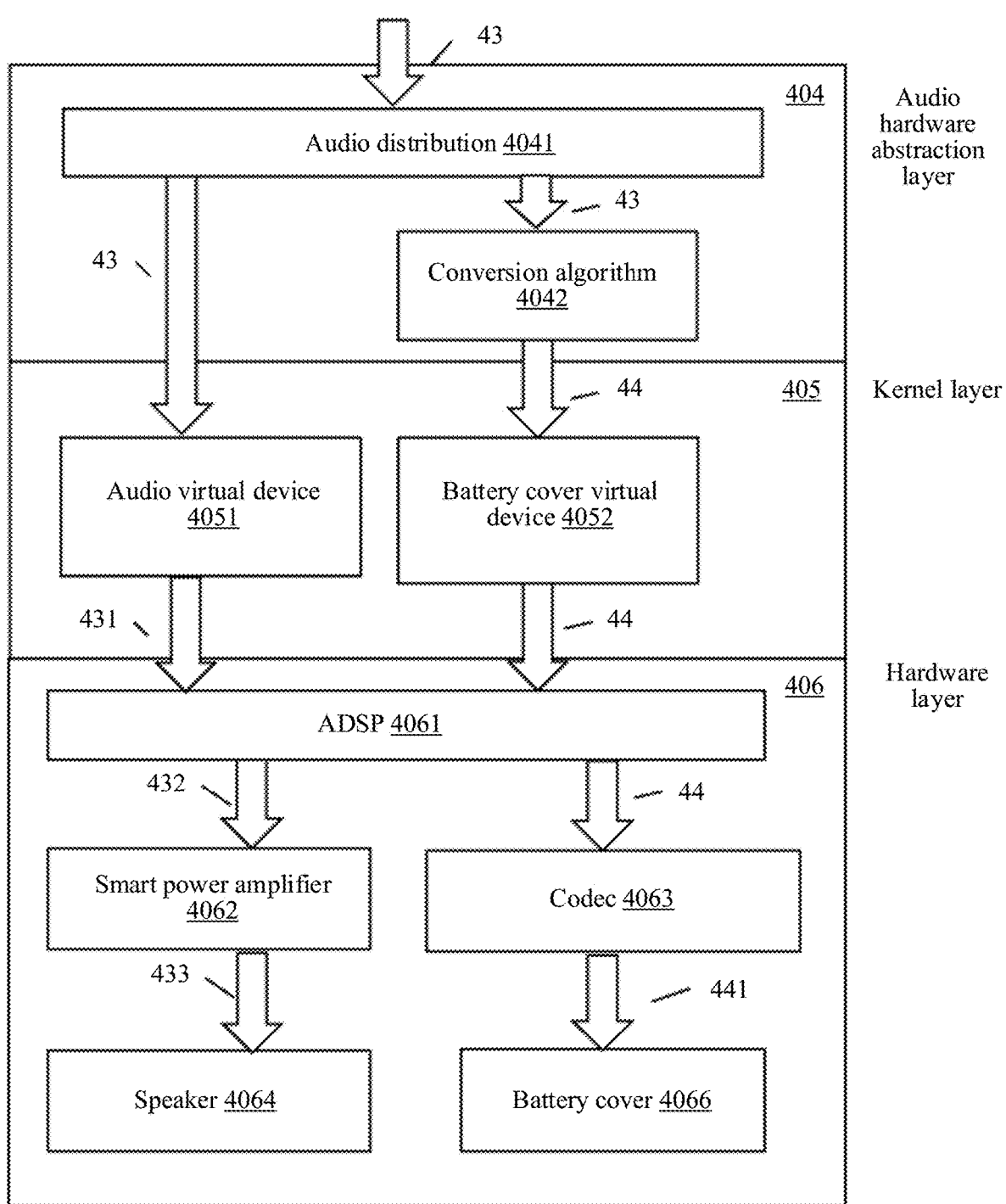
FIG. 4B is a software-to-hardware flow block diagram following the battery cover color change method of FIG. 4A according to this embodiment of this application.

FIG. 4B is a software-and-hardware flow block diagram following the battery cover color change method of FIG. 4A according to this embodiment of this application. Referring to FIG. 4B, after the audio data 43 arrives at the audio hardware abstraction layer 404, the audio data 43 may be sent by an audio distribution module 4041 to an audio virtual device (PCM) 4051 in a kernel layer 405. The audio virtual device 4051 in the kernel layer 405 may be configured to perform digital-to-analog conversion on the audio data 43 to generate audio data 431, and then send the audio data 431 to a hardware device (for example, a speaker 4064) in the hardware layer 406 for playing.

In another aspect, an audio distribution module 4041 in the audio hardware abstraction layer 404 may further send the audio data 43 to a conversion algorithm module 4042 for processing, to generate color change data 44. The generated color change data 44 may be sent to a battery cover virtual device 4052 in the kernel layer 405, to drive the battery cover to change colors. Similarly, the battery cover virtual device 4052 in the kernel layer 405 may perform digital-to-analog conversion on the color change data 44, to generate color change data 441, and then send the color change data 441 to a battery cover 4066 in a hardware layer 406, to drive the battery cover 4066 to change colors.

The conversion algorithm module 4042 may convert the audio data 43 into the color change data 44 by using a plurality of forms of conversion algorithms. For example, the conversion algorithm may be an audio rhythm identification (on-site detection) algorithm. In an implementation, the conversion algorithm module 4042 identifies rhythmic changes of the audio data by using an amplitude difference mean curve of the audio data 43, so as to generate the color change data 44 based on the rhythmic change thereof.

Figure 5:
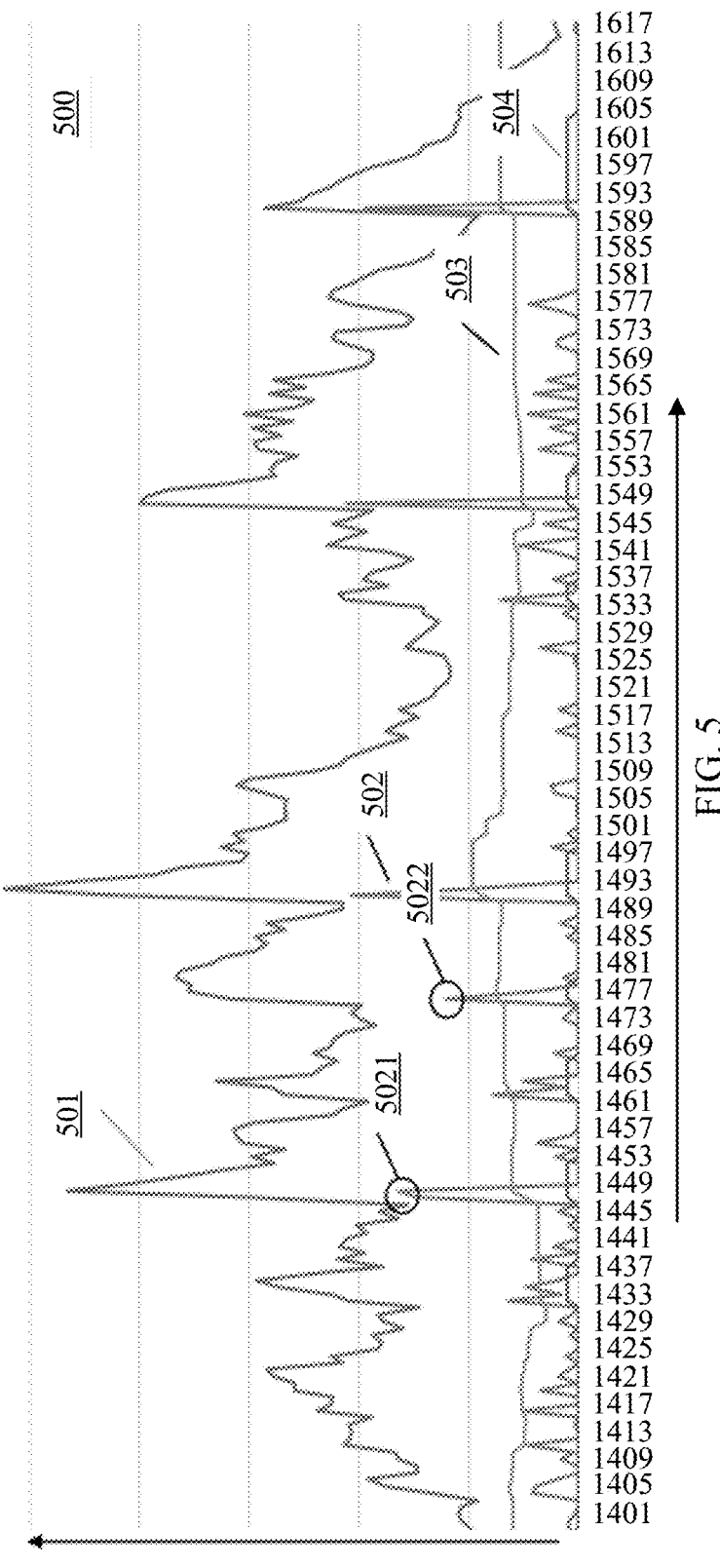
FIG. 5 is a curve graph of audio data according to an embodiment of this application.

The generation process of the color change data 44 is described in detail below with reference to FIG. 5. FIG. 5 is a curve graph of audio data according to an embodiment of this application.

In FIG. 5, an abscissa x of a graph 500 may represent sampling time points for the audio data. Specifically, numerals on the abscissa (for example, numerals 1425, 1429, and the like) represent only relative numbers of sampling time points, not absolute sampling moments. For example, at a sampling rate 48 k, 48000 sampling points may be obtained within 1 s. There are four curves 501-504 in the graph 500, and for different curves, an ordinate y of the graph 500 may separately represent different meanings.

In the graph 501, a coordinate y may represent an amplitude value of the audio data. Therefore, the curve 501 may be regarded as being obtained by sampling the amplitude value of the audio data at a fixed time interval, and thus the curve 501 may be referred to as an amplitude curve 501 of the audio data.

It can be seen that a position of the amplitude curve 501 is relatively high, that is, amplitude values of all sampling points thereof are relatively large. An amplitude value of the audio data may be affected by a volume at which the audio data is played by the electronic device. A larger volume at which the audio data is played by the electronic device indicates a larger amplitude value of the audio data and further indicates a higher position of the amplitude curve 501 in FIG. 5. If the color change data is generated based on the amplitude curve 501 of the audio data, that is, if an amplitude threshold is set, the color change data is emitted when the amplitude value of the audio data is higher than the amplitude threshold, and the color change data is not emitted when the amplitude value of the audio data is less than the amplitude threshold, the following problems may occur:

When the volume at which the audio data is played by the electronic device is relatively large, the position of the amplitude curve 501 of the audio data may be relatively high, amplitude values of the amplitude curve 501 may all be greater than the amplitude threshold, and as a result, the electronic device may always emit color change data during playing of the audio data. From the perspective of a user, the battery cover of the electronic device may consistently be in a second color state during ringing. On the contrary, when the volume at which the audio data is played by the electronic device is relatively small, the position of the amplitude curve 501 of the audio data may be relatively low, amplitude values of the amplitude curve 501 may all be less than the amplitude threshold, and as a result the electronic device cannot emit color change data during playing of the audio data. From the perspective of a user, the battery cover of the electronic device may not change colors during ringing, that is, the battery cover color change function is not implemented. To avoid such a situation, it is necessary to set a universal standard for generating color change data regardless of the volume of the electronic device.

In this embodiment of this application, a difference between amplitude values of two adjacent sampling time points is calculated based on the amplitude curve 501 of the audio data, to obtain an amplitude difference curve 502 as shown in FIG. 5. For the amplitude difference curve 502, a coordinate y of the graph 500 represents an amplitude difference. Therefore, by extracting differences of the amplitude curve 501, the influence of the volume at which the audio data is played by the electronic device on generation of the color change data can be eliminated. It can be seen from the amplitude difference curve 502 that if a difference between amplitude values of two successive sampling time points in the amplitude curve 501 is relatively large, spikes may appear in the amplitude difference curve 502, for example, spikes 5021 and 5022; if amplitude values of two successive sampling time points in the amplitude curve 501 are close to each other, a data point close to zero is obtained in the amplitude difference curve 501 even if the amplitude values at the two sampling time points are large in the amplitude curve 502. In this way, regardless of the volume at which the audio data is played by the electronic device, the amplitude difference curve 502 of the audio data can reflect a relative change of the amplitude values at different sampling time points in the audio data, and a generation rule of the color change data is designed by using the relative change of the amplitude values, which helps to obtain a conversion algorithm irrelevant of the type and volume of the audio data.

In the amplitude difference curve 502, the "spikes" therein may be identified as rhythm points, for example, the spikes 5021 and 5022 and the like may be identified as rhythm points. It can be seen that the amplitude differences of the audio data at the rhythm points are large. In the conversion algorithm, it may be specified that the electronic device sends a color change signal at the spikes of the audio data and does not send a color change signal at a non-spike area, so that the battery cover of the electronic device can appear that: during playing of the audio data by the electronic device, the battery cover changes colors at a rhythm point, and the battery cover does not change colors at a non-rhythm point, presenting an effect that the battery cover of the electronic device flickers and changes colors along with the rhythms of the audio data.

Further, in the conversion algorithm in this embodiment of this application, a rhythm point may be identified by using an amplitude threshold, that is, when the amplitude difference curve 502 is greater than a set amplitude threshold, the sampling time point may be identified as a rhythm point. However, if the amplitude threshold used to identify the rhythm point is a fixed value, there may still be the situation discussed above in actual applications that either the battery cover is always changing colors or the battery cover cannot change colors.

In this embodiment of this application, the following method may be used to set the amplitude threshold, so as to overcome the above defects, thereby identifying the rhythm point more accurately. As shown in FIG. 5, a mean value of the amplitude difference curve 502 within a particular time interval is obtained. For example, the time interval is 0.002 s. A mean value of amplitude differences of the amplitude difference curve 502 within every 0.002 s is obtained, to obtain an amplitude difference mean curve 503, as indicated by the curve 503 in FIG. 5. A data point on the amplitude difference mean curve 503 may be considered as an amplitude threshold at the sampling time point.

At a moment, that is, at a sampling time point, a sampling time point at which the amplitude difference in the amplitude difference curve 502 is greater than the amplitude threshold in the amplitude difference mean curve 3 may be identified as a rhythm point of the audio data. In the conversion algorithm in this embodiment of this application, it may be specified that: color change data is sent at each rhythm point for driving the battery cover to change colors. When the amplitude difference in the amplitude difference curve 502 falls back to less than the amplitude threshold in the amplitude difference mean curve 503, the sending of the color change data is stopped. A curve 504 in the graph 500 represents a color change signal curve generated by using the above conversion algorithm. An ordinate y of the color change signal curve represents a signal intensity. In some embodiments, the color change data is PCM format audio data.

By determining the amplitude threshold by using the amplitude difference mean curve 503, the process of determining an amplitude threshold can be applicable to a plurality of types of audio data, so as to identify a rhythm point of the audio data more accurately, so that color change data of the battery cover can be generated based on the rhythm point, thereby achieving an effect that the battery cover of the electronic device flickers and changes colors along with playing rhythms of the audio data.

From the perspective of a user, for example, during ringing of the electronic device, the battery cover of the electronic device may change colors at rhythm points of a ringtone. If the ringtone is a soothing music, rhythm points identified by using the conversion algorithm are more dispersed temporally, and a color change frequency of the battery cover is relatively low; if the ringtone is a rapid music, rhythm points identified by using the conversion algorithm are more intensive temporally, and a color change frequency of the battery cover is relatively high.

Therefore, the color change data 44 can be generated based on the audio data 43 by the conversion algorithm module 4042 provided in the audio hardware abstraction layer 404. By appropriately selecting a specific conversion algorithm used by the conversion algorithm module 4042, influence of the volume at which the audio data is played by the electronic device on the generation of the color change data can be avoided, and the rhythm points of the audio data can be identified more effectively.

Again referring to FIG. 4B, the conversion algorithm module 4042 sends the generated color change data 44 to the battery cover virtual device 4052 in the kernel layer 405. A particular battery cover virtual device 4052 may be designated for the color change data 44, and the battery cover virtual device 4052 may represent a battery cover device 4066 in the hardware layer 406. In the kernel layer 405, the battery cover virtual device 4052 and the audio virtual device 4051 are independent of each other, and the audio data 43 and the color change data 44 can be transmitted independently of each other, so that interference therebetween can be avoided.

In the kernel layer 405, the audio data 43 is further processed to form the audio data 431, and the audio data 431 and the color change data 44 are separately sent to an audio digital signal processor ADSP 4061 in the hardware layer 406.

The audio digital signal processor ADSP 4061 further processes the audio data 431 to obtain audio data 432, and the color change data 44 is transparently transmitted through the ADSP 4061, so that the audio data 432 and the color change data 44 can be respectively sent to actual hardware components by the ADSP 4061. Specifically, the audio data 432 may be obtained from the audio data 431 after being processed by the ADSP 4061, the audio data 432 may be sent to a smart power amplifier SmartPA 4062, to undergo digital-to-analog conversion by the SmartPA 4062, so as to generate final audio data 433, and the final audio data 433 is sent to the speaker 4064 for playing.

In another aspect, the color change data 44 may be sent to the codec 4063, so that the color change data 441 can be generated through digital-to-analog conversion, and the color change data 441 may be a 50 Hz sine wave signal. The color change data 441 may be sent to the battery cover 4066 to drive the battery cover 4066 to change colors. Therefore, the audio playing process of the electronic device is used, so that the color change data of the battery cover is generated and sent during playing of the audio data by the electronic device, to enable the battery cover of electronic device to change colors along with the playing of the audio data.

Embodiment 2

Figure 6A:
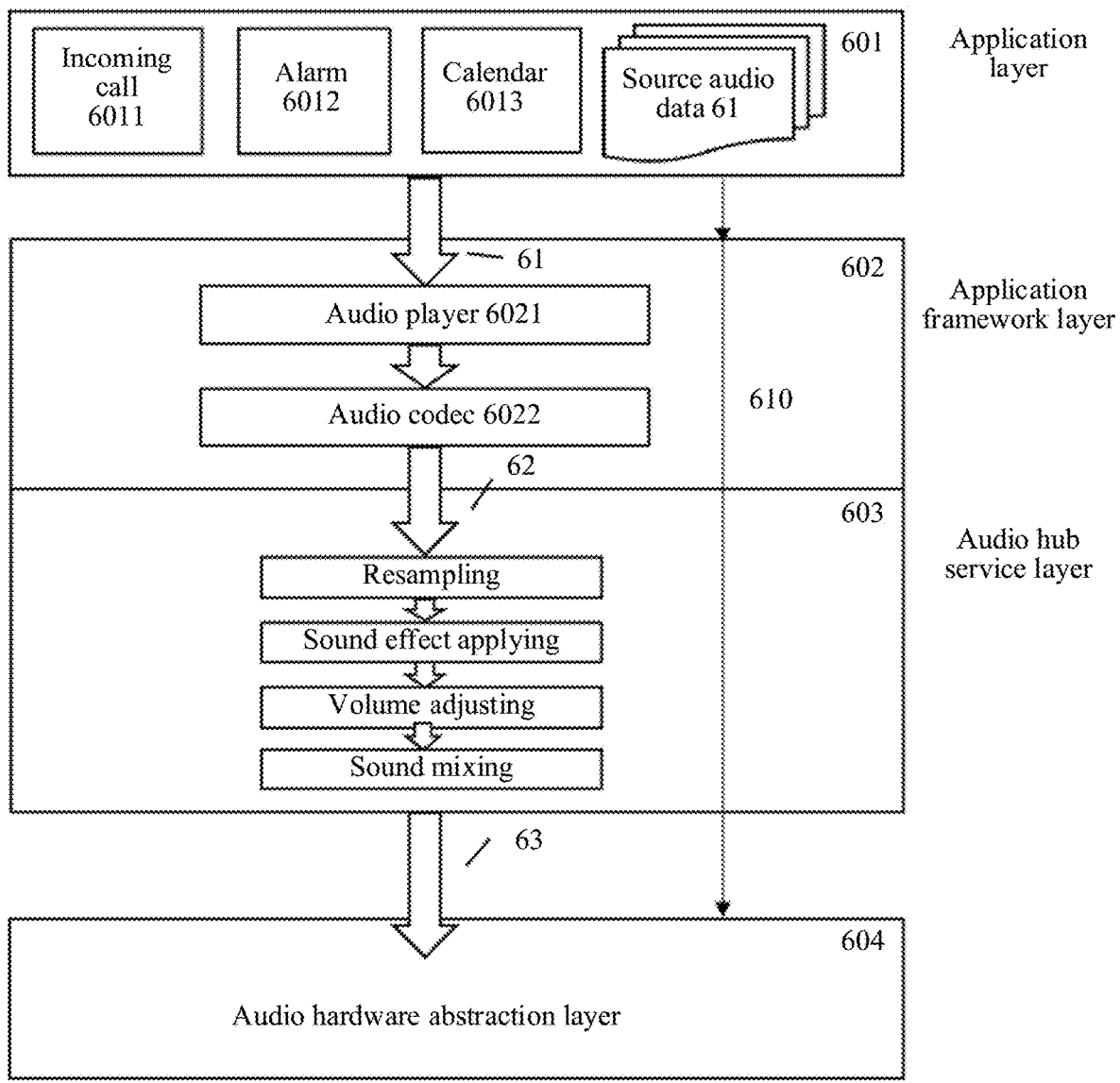
FIG. 6A is a software flow block diagram of another battery cover color change method according to an embodiment of this application.

FIG. 6A is a software flow block diagram of another battery cover color change method according to an embodiment of this application. This embodiment differs from Embodiment 1 in that: in this embodiment, the audio data may be manually edited in advance, and the color change data of the battery cover and the audio data are combined into source audio data, to be transmitted through the audio playing process. In the hardware abstraction layer, the color change data is split from the source audio data, and then sent to the battery cover in the hardware layer to drive the battery cover to change colors.

Referring to FIG. 6A, in a scenario such as an incoming call ringing, an alarm ringing, or a schedule reminder, an application (for example, an incoming call application 601, an alarm application 6012, or a calendar application 6013) in an application layer 601 first sends an audio control signal 610 to an audio hardware abstraction layer 604, to notify the audio hardware abstraction layer 604 that a battery cover color change function needs to be enabled for playing of audio data this time. The audio hardware abstraction layer 604, upon receipt of the audio control signal 610, configures a battery cover color change path, for example, turning on an audio virtual device (PCM) and a color change data path corresponding to color change data, and the like. In another aspect, the application may send an audio data stream (as indicated by wide arrows in FIG. 6A) to the application framework layer 602. The audio data stream may carry to-be-played source audio data 61.

The source audio data 61 may include audio data to be played by a speaker and color change data for driving the battery cover to change colors. For example, the color change data may be obtained by converting the audio data by using a conversion algorithm, and the conversion algorithm may be, for example, the conversion algorithm described in Embodiment 1. In other implementations, the conversion algorithm may also be a conversion algorithm in another form. In addition, in other implementations, the color change data may also be color change data capable of causing the battery cover to change colors at a fixed frequency, and color change data corresponding to different audio data may have different color change frequencies. The form of the color change data is not limited herein.

The audio data and the color change data may be manually edited in advance, so that audio data and the color change data are combined together to form the source audio data to be stored in a memory of the electronic device. When an application needs to play an audio, the source audio data may be sent to the application framework layer 602.

The application framework layer 602 may initialize an audio player 6021 in the electronic device upon detection of the source audio data 61. Then, the source audio data 61 may be decoded by an audio codec 6022 (the decoding process is a software decoding process, and may therefore be referred to as soft decoding), to obtain decoded source audio data 62. The decoded source audio data 62 is transferred to the audio hub service layer 603.

In the audio hub service layer 603, the audio data in the decoded source audio data 62 is processed, and processing content includes but is not limited to: resampling (Resample), sound effect applying (Apply Effect), volume adjusting (Adjust Volume), and sound mixing (Mixer). The color change data in the source audio data 62 may not be processed in the audio hub service layer 603.

Figure 7:
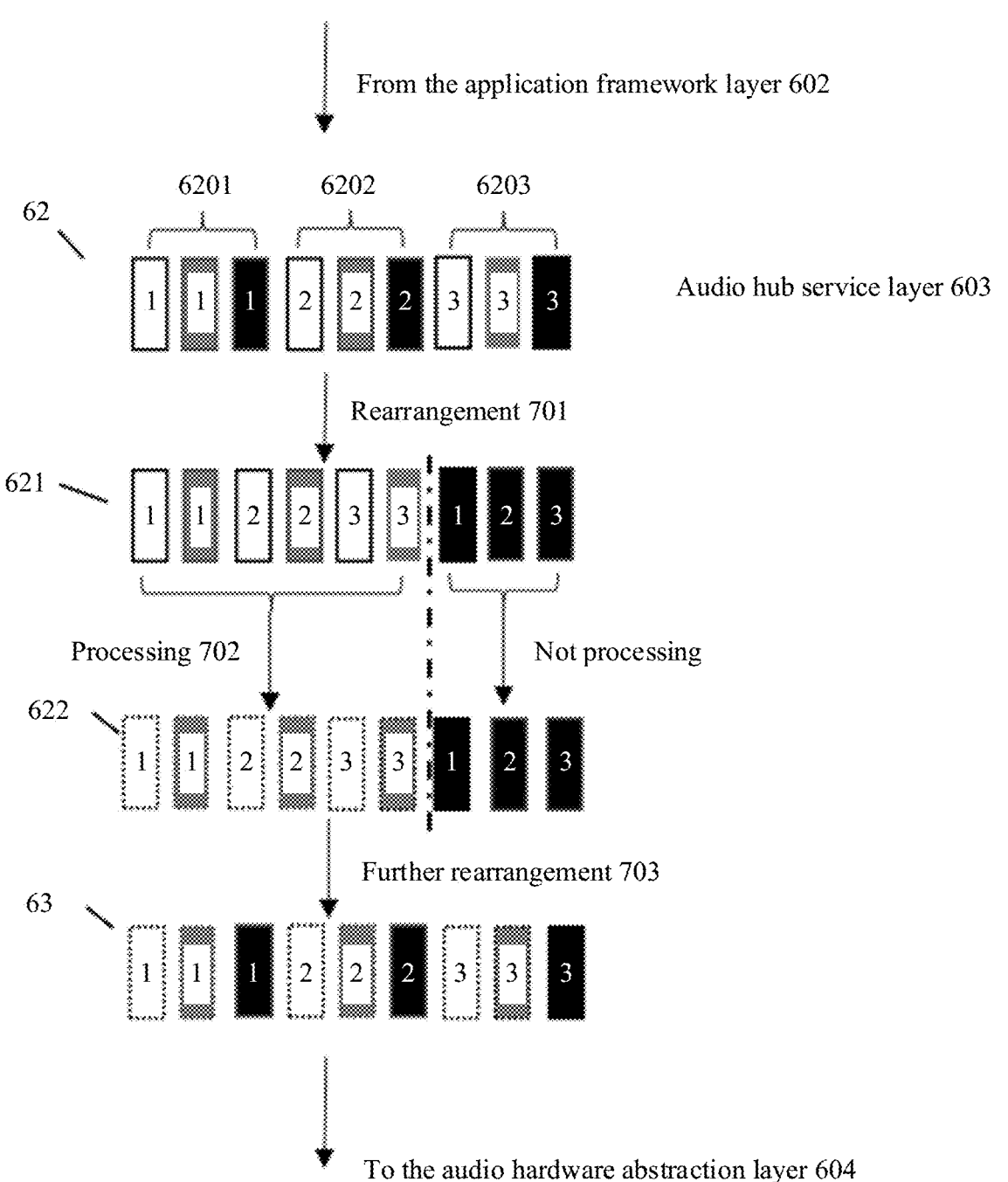
FIG. 7 is a schematic diagram of an audio data processing process according to an embodiment of this application.

FIG. 7 is a schematic diagram of an audio data processing process according to an embodiment of this application. In FIG. 7, the source audio data 62 from the application framework layer 602 is processed at the audio hub service layer 603. As shown in FIG. 7, the source audio data 62 from the application framework layer 602 generally includes three data channels (channels): A white box on the left and a gray box in the middle may represent left and right channel data of the audio data, respectively, and a black box on the right may represent color change data added through manual editing. The source audio data 62 may be sent in units of cycles. One white box, one gray box, and one black box may serve as a group to represent one source audio data cell. One cycle in the source audio data 62 may include a plurality of source audio data cells. In FIG. 7, for example, one cycle in the source audio data is used. The cycle may include three source audio data cells 6201, 6202, and 6203, and data channels in the source audio data cells are numbered 1, 2, and 3, respectively. In this way, left and right channel data of the color change data are aligned with those of the audio data temporally.

For the audio hub service layer 603, after receiving one cycle of source audio data 62 from the application framework layer 602, the audio hub service layer 603 may first perform rearrangement 701 on left channel data (white boxes 1-3), right channel data (gray boxes 1-3), and color change data (black boxes 1-3) in the three source audio data cells 6201, 6202, and 6203. Specifically, the rearrangement 701 may include: picking up color change data 1-3 from the source audio data cells 6201-6203 and sequentially arranging the color change data 1-3 at the end of the entire source audio data of the cycle, to obtain source audio data 621. As shown in FIG. 7, after the rearrangement, all the color change data (black boxes 1-3) in the source audio data 621 are sequentially located at the end of the source audio data 621.

Then, processing 702 is performed on the left channel data and the right channel data arranged in front, that is, the left channel data and the right channel data in each of the source audio data cells 6201-6203 represented by a white box 1, a gray box 1, a white box 2, a gray box 2, a white box 3, and a gray box 3 are processed. The processing is similar to that described above, including but not limited to: resampling, sound effect applying, volume adjusting, and sound mixing, to then obtain processed left channel data and right channel data, which are respectively represented by white dotted line boxes and gray dotted line boxes. At the same time, the color change data (black boxes 1-3) in each source audio data cell may be kept unchanged. In this way, scrambled source audio data 622 can be obtained. In the scrambled source audio data 622, the processed left channel data and the processed right channel data are located in front of the color change data.

Next, further rearrangement 703 may be performed on the left channel data, the right channel data, and the color change data in the scrambled source audio data 622. Specifically, the further rearrangement 703 may include: inserting the color change data 1-3 back into positions, in the corresponding source audio data cells 6201-6203, where color change data 1-3 are originally in. For example, the color change data, a black box 1, in the source audio data cell 6201 is inserted between the processed right channel data (a gray dotted line box 1) in the source audio data cell 6201 and the processed left channel data (a white dotted line box 2) in the source audio data cell 6202, and so on. The source audio data 63 may be obtained by subjecting the scrambled source audio data 622 to the further rearrangement 703.

Finally, the obtained source audio data 63 may be sent to the audio hardware abstraction layer 604 for further processing.

Figure 6B:
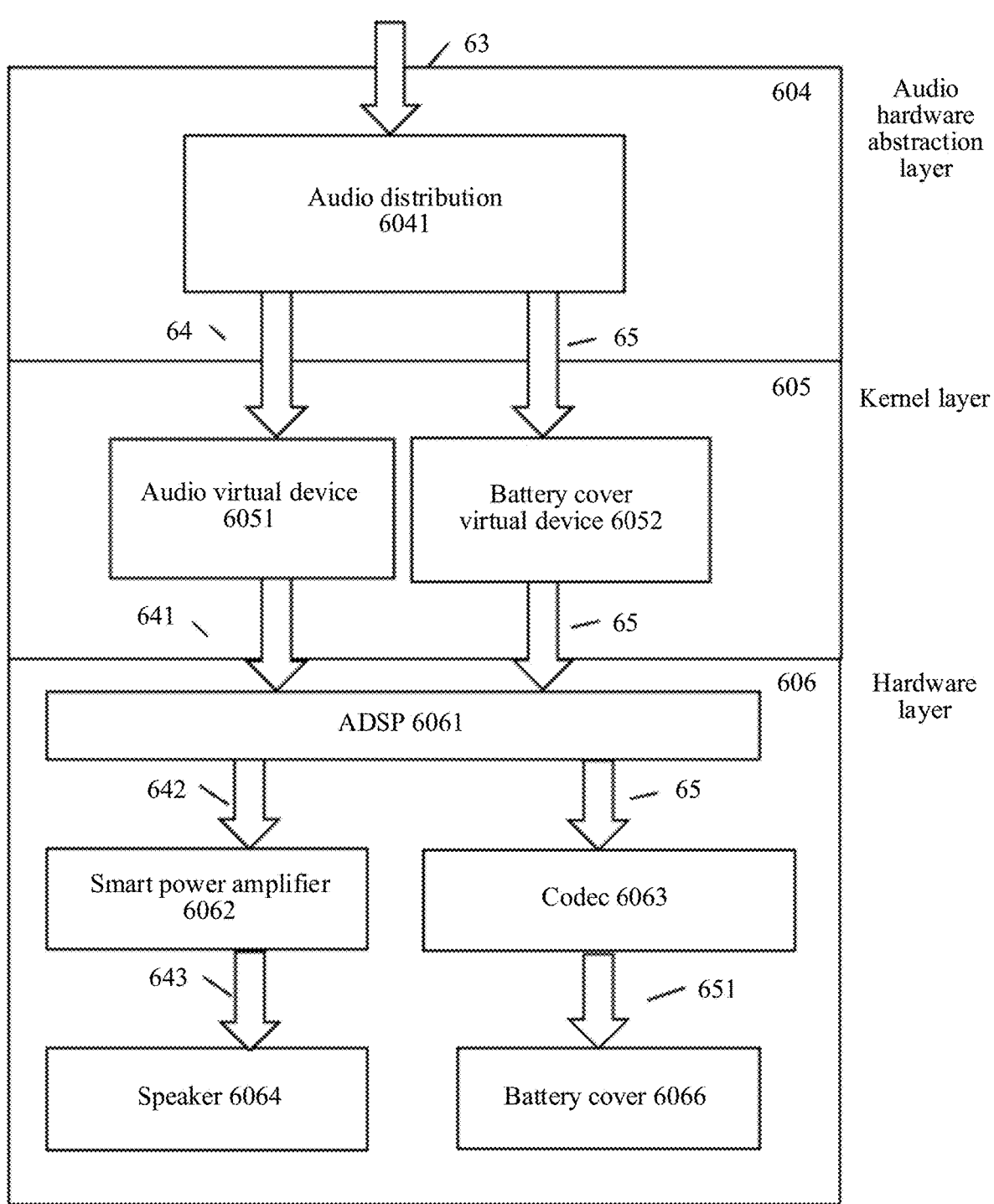
FIG. 6B is a software-to-hardware flow block diagram following the battery cover color change method of FIG. 6A according to this embodiment of this application.

Reference is made back to FIG. 6B. FIG. 6B is a software-to-hardware flow block diagram following the battery cover color change method of FIG. 6A according to this embodiment of this application. Referring to FIG. 6B, after being sent to the audio hardware abstraction layer 604, the source audio data 63 may be split by an audio splitting module 6041. The audio splitting module 6041 may split the source audio data 63 into audio data 64 and color change data 65. For example, for the source audio data shown in FIG. 7, the audio splitting module 6041 may separate the left channel data and the right channel data from the color change data in the source audio data, so that the left channel data and the right channel data form one path of data, and the color change data form another path of data independent of that of the left channel data and the right channel data.

Further, the audio data 64 obtained through splitting is sent to an audio virtual device (PCM) 6051 in the kernel layer 605; and the color change data 65 obtained through splitting is sent to a battery cover virtual device (PCM) 6052 in the kernel layer 605. The audio virtual device 6051 in the kernel layer 605 may be configured to perform digital-to-analog conversion on the audio data 64 to generate the audio data 641, so as to send the audio data 64 to a hardware device (for example, a speaker 6064) in the hardware layer 606 for playing. Similarly, the battery cover virtual device 6052 in the kernel layer 605 performs digital-to-analog conversion on the color change data 65 to generate the color change data 651, so as to then send the color change data 651 to the battery cover 6066 in the hardware layer 606 for displaying.

A particular battery cover virtual device 6052 may be designated for the color change data 65, and the battery cover virtual device 6052 represents a battery cover device 6066 in the hardware layer 606. In the kernel layer 605, the battery cover virtual device 6052 and the audio virtual device 6051 are independent of each other, and the color change data 65 and the audio data 64 can be transmitted independently of each other, so that interference therebetween can be avoided.

In the kernel layer 605, the audio data 64 is further processed to form the audio data 641, and the audio data 641 and the color change data 65 are separately sent to an audio digital signal processor ADSP 6061 in the hardware layer 606.

The audio digital signal processor ADSP 6061 further processes the audio data 641 to obtain audio data 642, and the color change data 65 is transparently transmitted through the ADSP 6061, so that the audio data 642 and the color change data 65 can be respectively sent to actual hardware components by the ADSP 6061. Specifically, the audio data 642 may be obtained from the audio data 641 after being processed by the ADSP 6061, the audio data 642 may be sent to a smart power amplifier SmartPA 6062, to undergo digital-to-analog conversion by the SmartPA 6062, so as to generate speaker audio data 643, and the speaker audio data 643 is sent to the speaker 6064 for playing.

In addition, the color change data 65 may be sent to the codec 6063 for digital-to-analog conversion, so that the color change data 651 can be generated, and the color change data 651 may be a 50 Hz sine wave signal. The color change data 651 may be sent to the battery cover 6066 to drive the battery cover 6066 to change colors. Therefore, the audio playing process of the electronic device is used, so that the color change data is sent during playing of the audio data by the electronic device, to enable the battery cover of electronic device to change colors along with playing rhythms of the audio data.

Embodiment 3

Figure 8A:
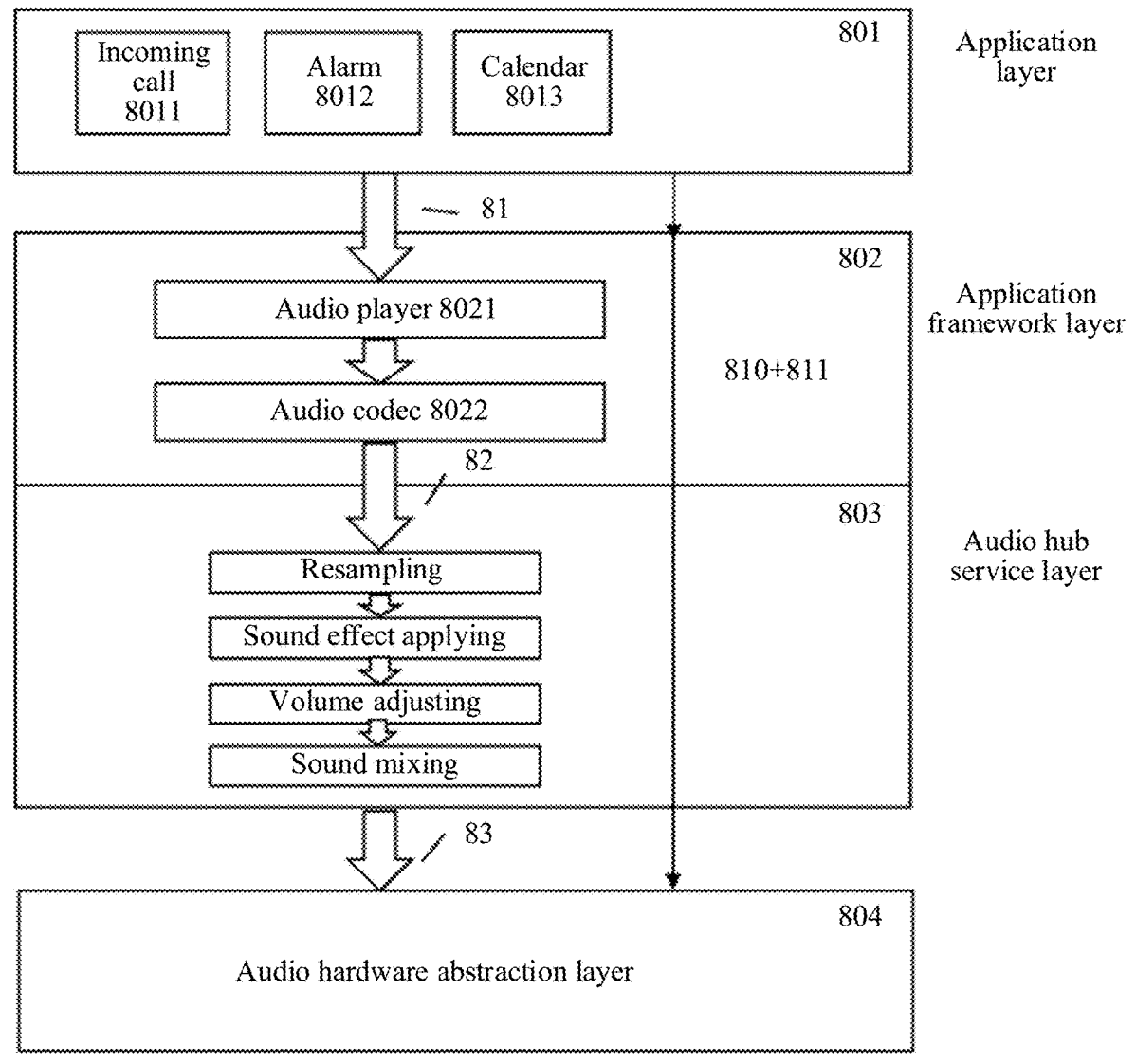
FIG. 8A is a software flow block diagram of yet another battery cover color change method according to an embodiment of this application.

FIG. 8A is a software flow block diagram of yet another battery cover color change method according to an embodiment of this application. This embodiment differs from Embodiment 1 in that: the color change data is stored in the hardware abstraction layer, and the hardware abstraction layer loads the corresponding color change data based on an index sent by an application, so as to drive the battery cover to change colors.

In this embodiment of this application, audio data to be played by the application is indexed. In other words, audio data in an application such as an incoming call application, an alarm application, or a calendar application is numbered. For example, in a case that ten incoming call ringtones are set in an electronic device, that is, in a case that ten ringtones for a user to select to be played for an incoming call are stored in the electronic device, the ten incoming call ringtones may be indexed, respectively. For example, indexes are 0-9. Ten pieces of color change data respectively corresponding to the audio data corresponding to the ten ringtones may be stored. For example, the color change data may be obtained by converting the audio data by using a conversion algorithm, and the conversion algorithm may be, for example, the conversion algorithm described in Embodiment 1. In other implementations, the conversion algorithm may also be a conversion algorithm in another form. In addition, in other implementations, the color change data may also be color change data capable of causing the battery cover to change colors at a fixed frequency, and color change data corresponding to different audio data may have different color change frequencies. The form of the color change data is not limited herein. Further, the color change data may be stored in an audio hardware abstraction layer 804.

Referring to FIG. 8A, in a scenario such as an incoming call ringing, an alarm ringing, or a schedule reminder, an application (for example, an incoming call application 8011, an alarm application 8012, or a calendar application 8013) in an application layer 801 first sends an audio control signal 810 to an audio hardware abstraction layer 804, to notify the audio hardware abstraction layer 804 that a battery cover color change function needs to be enabled for playing of audio data this time. In addition, an index 811 of the audio data to be played is sent together with the audio control signal 810. The audio hardware abstraction layer 804, upon receipt of the audio control signal 810, configures a battery cover color change path, for example, turning on an audio virtual device (PCM) and a color change data path corresponding to color change data, and the like. In addition, the audio hardware abstraction layer 804 further needs to perform more detailed color change data configuration upon receipt of the index 811, which is to be explained in detail below. In another aspect, the application may send an audio data stream (as indicated by wide arrows in FIG. 8A) to the application framework layer 802. The audio data stream may carry audio data to be played 81.

The application framework layer 802 may initialize an audio player 8021 in the electronic device upon detection of the audio data 81. Then, the audio data 81 may be decoded by an audio codec 8022 (the decoding process is a software decoding process, and may therefore be referred to as soft decoding), to obtain decoded audio data 82. The audio data 82 is transferred to the audio hub service layer 803.

The audio hub service layer 803 processes the decoded audio data 82 to obtain audio data 83. The processing content includes but is not limited to: resampling (Resample), sound effect applying (Apply Effect), volume adjusting (Adjust Volume), and sound mixing (Mixer). The processed audio data 83 may then arrive at the audio hardware abstraction layer AudioHal 804 for further processing.

The audio hardware abstraction layer 804 may configure a battery cover path upon receipt of the audio control signal 810 from the application layer 801. In this case, the audio hardware abstraction layer 804 further needs to determine whether the audio data 83 is to be played by a speaker of the electronic device. If the electronic device is connected to an external device such as a headset or a Bluetooth speaker, so that the audio data is to be played by the headset or the Bluetooth speaker instead of by the speaker, the audio hardware abstraction layer 804 may not configure the battery cover path, that is, does not turn on the audio virtual device (PCM) and the color change data path corresponding to the color change data. In this case, the audio data only arrives at the external device through an audio data path for playing, and the battery cover does not change colors. Upon determining that the audio data is to be played by the speaker of the electronic device, the audio hardware abstraction layer 804 configures the battery cover path, specifically in the following.

Figure 8B:
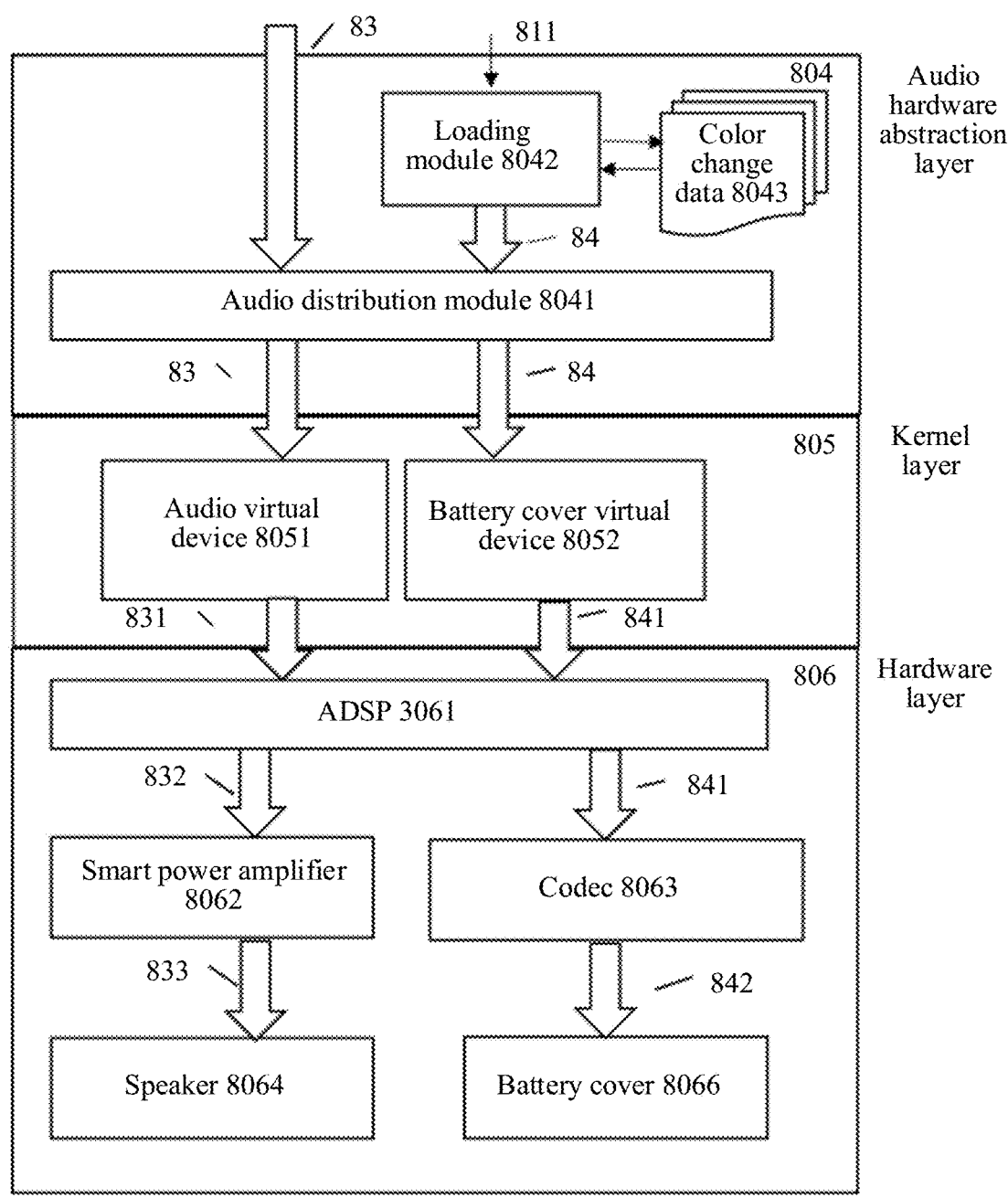
FIG. 8B is a software-to-hardware flow block diagram following the battery cover color change method of FIG. 8A according to an embodiment of this application.

Referring to FIG. 8B, after the audio data 83 arrives at the audio hardware abstraction layer 804, the audio data 83 may be sent by an audio distribution module 8041 to an audio virtual device (PCM) 8051 in a kernel layer 805. The audio virtual device 8051 in the kernel layer 805 may be configured to perform digital-to-analog conversion on the audio data 83 to generate audio data 831, and then send the audio data 831 to a hardware device (for example, a speaker 8064) in the hardware layer 806 for playing.

In another aspect, based on the received index 811, a loading module 8042 in the audio hardware abstraction layer 804 may load, from a color change data folder 8043, the color change data 84 corresponding to the index. The color change data 84 may be sent by the audio distribution module 8041 to a battery cover virtual device 8052 in the kernel layer 805, to drive the battery cover to change colors. Similarly, the battery cover virtual device 8052 in the kernel layer 805 may perform digital-to-analog conversion on the color change data 84 to generate the color change data 841, so as to then send the color change data 841 to the battery cover 8066 in the hardware layer 806 for displaying.

A particular battery cover virtual device 8052 may be designated for the color change data 84, and the battery cover virtual device 8052 may represent a battery cover device 8066 in the hardware layer 806. In the kernel layer 805, the battery cover virtual device 8052 and the audio virtual device 8051 are independent of each other, and the audio data 83 and the color change data 84 can be transmitted independently of each other, so that interference therebetween can be avoided.

In the kernel layer 805, the audio data 83 may be further processed to form the audio data 831, and the audio data 831 and the color change data 84 are separately sent to an audio digital signal processor ADSP 8061 in the hardware layer 806.

The audio digital signal processor ADSP 8061 further processes the audio data 831 to obtain audio data 832, and the color change data 84 is transparently transmitted through the ADSP 8061, so that the audio data 832 and the color change data 84 can be respectively sent to actual hardware components by the ADSP 8061. Specifically, the audio data 832 may be obtained from the audio data 831 after being processed by the ADSP 8061, the audio data 832 may be sent to a smart power amplifier SmartPA 8062, to undergo digital-to-analog conversion by the SmartPA 8062, so as to generate audio data 83, and the audio data 833 is sent to the speaker 8064 for playing.

In another aspect, the color change data 841 may be sent to the codec 8063, so that the color change data 842 can be generated through digital-to-analog conversion, and the color change data 842 may be a 50 Hz sine wave signal. The color change data 842 may be sent to the battery cover 8066 to drive the battery cover 8066 to change colors. Therefore, the audio playing process of the electronic device is used, so that the color change data is played during playing of the audio data by the electronic device, to enable the battery cover of electronic device to change colors along with the playing of the audio data.

In an implementation, a user may select external audio data as the audio data to be played in the above scenarios. In other words, in a scenario such as an incoming call ringing, an alarm ringing, or a schedule reminding, the user may set that the electronic device plays the external audio data, that is, not audio data built in when the electronic device leaves the factory, for example, a song downloaded by the user from the Internet or an audio from an external memory. The external audio data may be uniformly compiled into a default index value (for example, 0) in the audio system, that is, all external audio data correspond to an index value 0, and the index value 0 may be enabled to correspond to default color change data. Therefore, the electronic device can implement a battery cover color change function by using default color change data during playing of non-preset audio data.

In this embodiment of this application, function modules of the electronic device may be divided based on the foregoing method examples. For example, each function module may be divided based on each function, or two or more functions may be integrated into one processing module. The integrated module may be implemented in the form of hardware, or may be implemented in a form of a software functional module. It should be noted that in this embodiment of this application, the module division is an example, and is merely logical function division, and there may be other division manners during actual implementation.

An embodiment of this application further provides a computer-readable storage medium. The computer-readable storage medium stores instructions, and the instructions, when run on an electronic device, cause the electronic device to perform the related method steps shown in FIG. 4A and FIG. 4B, FIG. 6A and FIG. 6B, or FIG. 8A and FIG. 8B, to implement the battery cover color change method in the foregoing embodiments.

This embodiment further provides a computer program product including instructions, and the computer program product, when run on an electronic device, causes the electronic device to perform the related method steps in the method embodiments shown in FIG. 4A and FIG. 4B, FIG. 6A and FIG. 6B, or FIG. 8A and FIG. 8B, to implement the battery cover color change method in the foregoing embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work processes of the system, the apparatus and the units described above, reference may be made to the corresponding processes in the foregoing method embodiments. Details are not described herein again.

In the several embodiments provided in this embodiment, it should be understood that the disclosed battery cover color change method and apparatus may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

When the integrated unit is implemented in the form of a software functional unit and sold or used as an independent product, the integrated unit may be stored in a computer-readable storage medium. Based on such an understanding, the technical solutions of this embodiment essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments. The storage medium includes: any medium that can store program code, such as a flash memory, a removable hard disk, a read-only memory, a random access memory, a magnetic disk, or a compact disc.

Finally, it should be noted that: the above embodiments are merely used for describing the technical solutions of this application, but are not intended to limit this application. Although this application is described in detail with reference to the foregoing embodiments, it should be appreciated by a person of ordinary skill in the art that, modifications may still be made to the technical solutions described in the foregoing embodiments, or equivalent replacements may be made to the part of the technical features; and these modifications or replacements will not cause the essence of corresponding technical solutions to depart from the spirit and scope of the technical solutions in the embodiments of this application.

The invention claimed is:

1. A battery cover color change method, applicable to an electronic device, wherein the electronic device comprises an application and a battery cover, and the method comprises:

sending, by the application, an audio control signal to an audio hardware abstraction layer, wherein the audio control signal is used for configuring a battery cover path, and the battery cover path is used for transmitting and processing color change data;

determining whether a battery cover color change switch is in an on state;

initiating, by the application, an audio playing process on first audio data, wherein the first audio data sequentially passes through an application layer, an application framework layer, an audio hub service layer, the audio hardware abstraction layer, and a kernel layer in the audio playing process;

in the audio playing process, obtaining the color change data based on the first audio data, wherein the color change data corresponds to rhythms of the first audio data; and playing the first audio data while the battery cover changes colors in accordance with the rhythms of the first audio data driven by the color change data.

2. The method according to claim 1, wherein the application is one of the following:

an incoming call application, an alarm application, or a calendar application.

3. The method according to claim 1, wherein initiating, by the application, the audio playing process on the first audio data comprises:

sending, by the application layer, the first audio data to the application framework layer;

processing, separately by the application framework layer and the audio hub service layer, the first audio data, wherein the audio hub service layer outputs second audio data to the audio hardware abstraction layer; and receiving and processing, by the audio hardware abstraction layer, the second audio data to obtain third audio data, and outputting the third audio data to an audio virtual device in the kernel layer.

4. The method according to claim 1, wherein in the audio playing process, obtaining the color change data based on the first audio data comprises:

generating the color change data based on the first audio data by using a conversion algorithm.

5. The method according to claim 4, wherein the conversion algorithm is an audio rhythm identification algorithm, to enable rhythms of the color change data to correspond to the rhythms of the first audio data.

6. The method according to claim 1, wherein in the audio playing process, obtaining the color change data based on the first audio data comprises:

obtaining, using a conversion algorithm in the audio hardware abstraction layer, the color change data based on second audio data, and outputting the color change data to a battery cover virtual device in the kernel layer.

7. The method according to claim 1, wherein in the audio playing process, obtaining the color change data based on the first audio data further comprises:

obtaining the first audio data comprising the color change data, wherein the color change data is manually edited and combined into the first audio data in advance; and splitting the color change data from the first audio data by using a splitting algorithm.

8. The method according to claim 7, wherein in the audio playing process, obtaining the color change data based on the first audio data further comprises:

splitting, in the audio hardware abstraction layer, second audio data into third audio data and the color change data, outputting the third audio data to an audio virtual device in the kernel layer, and outputting the color change data to a battery cover virtual device in the kernel layer.

9. The method according to claim 7, wherein the color change data is obtained from the first audio data that has undergone an audio rhythm identification algorithm.

10. The method according to claim 1, wherein:

the color change data is stored in the electronic device, the audio control signal comprises an index corresponding to the first audio data, the color change data is loaded based on the index, and the color change data corresponds to the first audio data.

11. The method according to claim 10, wherein in the audio playing process, obtaining the color change data based on the first audio data further comprises:

loading, in the audio hardware abstraction layer, the color change data based on the index, and transmitting the color change data to the audio hardware abstraction layer.

12. The method according to claim 11, wherein the color change data is obtained from the first audio data that has undergone an audio rhythm identification algorithm.

13. The method according to claim 11, wherein the audio hardware abstraction layer outputs the color change data to a battery cover virtual device in the kernel layer.

14. The method according to claim 10, wherein when the first audio data is external audio data, default color change data corresponding to a default index is loaded.

15. The method according to claim 1, wherein the playing the first audio data further comprises:

playing, by a speaker of the electronic device, the first audio data.

16. The method according to claim 1, wherein configuring the battery cover path comprises:

turning on an audio virtual device and a color change data path corresponding to the color change data, wherein the color change data path enables the color change data and audio data to be transmitted independently of each other in the audio playing process.

17. An electronic device, wherein the electronic device comprises: one or more processors, a memory, and a battery cover, wherein the memory stores program code; and wherein the one or more processors run the program code, to cause the electronic device to perform operations comprising:

sending, by an application, an audio control signal to an audio hardware abstraction layer, wherein the audio control signal is used for configuring a battery cover path, and the battery cover path is used for transmitting and processing color change data;

determining whether a battery cover color change switch is in an on state;

initiating, by the application, an audio playing process on first audio data, wherein the first audio data sequentially passes through an application layer, an application framework layer, an audio hub service layer, the audio hardware abstraction layer, and a kernel layer in the audio playing process;

in the audio playing process, obtaining the color change data based on the first audio data, wherein the color change data corresponds to rhythms of the first audio data; and playing the first audio data while the battery cover changes colors in accordance with the rhythms of the first audio data driven by the color change data.

18. The electronic device according to claim 17, wherein the application is one of the following:

an incoming call application, an alarm application, or a calendar application.

19. The electronic device according to claim 17, wherein initiating, by the application, the audio playing process on the first audio data comprises:

sending, by the application layer, the first audio data to the application framework layer;

processing, separately by the application framework layer and the audio hub service layer, the first audio data, wherein the audio hub service layer outputs second audio data to the audio hardware abstraction layer; and receiving and processing, by the audio hardware abstraction layer, the second audio data to obtain third audio data, and outputting the third audio data to an audio virtual device in the kernel layer.

20. The electronic device according to claim 17, wherein in the audio playing process, obtaining the color change data based on the first audio data comprises:

generating the color change data based on the first audio data by using a conversion algorithm.

* * * * *